United States Patent
Schuele

[11] Patent Number: 5,924,816
[45] Date of Patent: *Jul. 20, 1999

[54] INTERCHANGEABLE LOCKING IMPLEMENT HANDLE

[76] Inventor: Otto Schuele, 42 Maplecrest Court, Ontario, Canada, L4M 4Y8

[*] Notice: This patent is subject to a terminal disclaimer.

[21] Appl. No.: 08/712,624

[22] Filed: Sep. 11, 1996

Related U.S. Application Data

[62] Division of application No. 08/391,561, Feb. 21, 1995, Pat. No. 5,603,584.

[51] Int. Cl.⁶ ........................................................ B25G 3/20
[52] U.S. Cl. ........................ 403/371; 403/316; 56/400.05; 56/400.19
[58] Field of Search ..................................... 403/309, 299, 403/342, 343, 371, 315, 316, 320, 370; 56/400.01, 400.04, 400.05, DIG. 18, 400.19

[56] References Cited

U.S. PATENT DOCUMENTS

| 4,642,837 | 2/1987 | Nichols et al. ...................... 403/342 X |
| 5,161,278 | 11/1992 | Tomm ................................. 403/299 X |
| 5,172,447 | 12/1992 | Tomm ................................. 403/299 X |
| 5,603,584 | 2/1997 | Schuele ........................... 56/400.05 X |
| 5,649,780 | 7/1997 | Schall ................................. 403/370 X |

FOREIGN PATENT DOCUMENTS

| 535867 | 4/1993 | European Pat. Off. ............... 403/299 |
| 585484 | 3/1924 | France .................................. 403/343 |
| 1051443 | 1/1954 | France .................................. 403/343 |
| 1211580 | 3/1966 | Germany .............................. 403/343 |
| 2110 | of 1906 | United Kingdom ................... 403/343 |

*Primary Examiner*—Harry C. Kim
*Attorney, Agent, or Firm*—Eugene J.A. Gierczak

[57] ABSTRACT

A threaded connector is disclosed for attaching a handle to a tool head, such as a rake or a broom. The threaded connector may include a central cap or plug and a plurality of opposed wings extending radially outwardly therefrom. The wings are in the form of hollow partial cylinders and are hingeably attached to the cap. The cap is positioned on the end of the handle and the wings are folded downwardly and inwardly to engage the handle. Each wing includes partial thread segments that register to form a full thread when the wings are folded together. The full thread has a shallow taper such that tightening of the connector within a mating socket in a tool head causes the connector to bind or wedge itself into the socket. To provide additional resistance to loosening a locking ring has longitudinal tenons which key into aligned rabbets in the connector and in the socket.

10 Claims, 11 Drawing Sheets

INTERCHANGEABLE LOCKING IMPLEMENT HANDLE

This is a division of application Ser. No. 08/391,561, filed Feb. 21, 1995, U.S. Pat. No. 5,603,584.

FIELD OF INVENTION

This invention relates to connectors, and in particular to connectors for attaching tools to handles such as attaching a rake head to a handle in a garden rake.

BACKGROUND ART

The problem of attaching a long handle to an implement head is one of long standing. Classically one finds a long, solid wooden handle mated with an iron or steel end formed in the shape of one kind of tool head or another. The metal tool head typically comprises a socket for receiving one end of the handle. The difficulty is in providing an attachment means that is tight, and will remain tight over years of use. In the past the handles have been given tapered ends, and the heads have sometimes been heated and cooled to fit on them. Often a nail or screw is driven transversely through the socket into the handle to prevent rotation. Particularly common with brooms is the device of a coarsely threaded socket in the wooden broom head transverse member suited to engage an equally coarsely threaded handle end. Theses sockets have been found frequently to be unsatisfactory.

In some cases glues have been used in these sockets to take up the mismatch in fit between the handle and the socket. Often the insertion of the handle into the socket causes the glue to be pushed or squeezed out of the joint, and so not to form the uniform bond that had been desired.

A related problem involves the use of one handle with several different tools. As noted in U.S. Pat. No. 4,466,377 to Kolb et al. it is often desirable to reduce the storage space required for a set of garden implements and use of a common handle for several tools is therefore advantageous. Further, one may wish to replace either the head or the handle, rather than having to discard both if one has worn out.

Yet a further related problem concerns the use of hollow tubular implement handles. Traditional wooden tool handles are usually solid. More recently tool handles have been made from moderately thin walled steel and aluminum tubing, from plastic, and from laid up fibreglass. These tubular members combine the advantages of strength and lightness.

Tubular members present two different challenges to the designer. First, transverse holes in tubular members are particularly troublesome stress concentration sites. After a period of working a handle tends to loosen, and then the transverse nail, screw, or rivet tends to work in the hole, tearing or deforming the tube. In composites structures the laminate in the region of the hole is soon destroyed. Second, while it is recognized that threaded connections are generally preferred over merely a smooth, tapered fit, it may be difficult to thread thin walled tube stock satisfactorily, and doubly so with composite thin walled tube stock. Even when threaded the region of the tube adjacent the socket is a zone of stress concentration and failure. It is difficult, and expensive to pre-mold threads into tube stock, and the threads so formed may be unsatisfactory.

In U.S. Pat. No. 4,466,377 to Kolb et al., one finds a bayonet-like implement prong to locate within a female socket. The prong has a transverse hole and is held in place by a releasable leaf spring. It is the leaf-spring itself which prevents the prong from disengaging from the socket when the handle is being used to pull an object, such as might occur while raking leaves.

In U.S. Pat. No. 5,161,278 to Tomm one finds that the long-standing broom handle problem is addressed with a multipart threaded-socket and handle system. This system includes a locking ring which is captured between a lock nut and the, presumably, wooden, transverse head member. The tight retention of the tool head depends on the hand-tightened locknut remaining tight, and on some amount of deformation of the wooden tool head as the teeth of the locking ring dig in. This deformation may not be desired.

Therefore, there has been a long felt need for an attachment means for attaching a handle to a tool head that may be well tightened, which has a locking means to prevent the head from turning about the handle, or wobbling during use, and which allows for removal of the handle from the head.

DESCRIPTION OF THE INVENTION

The present invention relates to an interchangeable connector for mounting to an implement handle and reception within a socket of an implement tool head, and specifically a connector system suited for use with a rake having a movable debris receptacle. In a first aspect of the invention there is a connector comprising a clamshell member including a central cap having a top peripheral edge portion, and a plurality of opposed wings hingeably attached to the top peripheral edge portion; the wings being in the form of hollow partial cylinders, such that as the wings are folded inwardly toward the cap, the partial cylinders come together to form a generally full cylinder; and the wings defining outer partial fastening structure which are in registration to form a full fastening structure when the wings are folded inwardly.

In a second aspect of the invention there is disclosed a connector system for fixedly and removably mounting a handle to a tool head, that connector system comprising a threaded male connector and a threaded female socket for mating engagement with each other; the male connector affixed to said handle; the tool head comprising the socket; the male connector formed from a clamshell blank; the clamshell blank comprising at least two depending wings each moveable from a first, developed position to a second, folded position; each wing comprising thread portions disposed in an external surface thereof; in the second position the threaded portion of those wings co-operating to form at least one substantially continuous thread for engaging the socket.

In a third aspect of the invention one finds a connector system for fixedly mounting a handle to a tool head that system comprising a threaded male connector affixed to an end of the handle; the tool head comprising a threaded female socket for reception of the connector and for threaded engagement thereof; the threaded male connector comprising a tapered threaded portion whereby tightening causes the connector to bind within the socket.

In a fourth aspect of the invention herein one finds a connector system for fixedly mounting a handle to a tool head, that system comprising a threaded male connector affixed to an end of the handle; the tool head comprising a threaded female socket for reception of the connector and threaded engagement thereof; handle having a longitudinal axis; a locking ring comprising one of (i) at least one rabbet, or (ii) at least one mortice; the connector comprising an external flange extending perpendicularly to the axis the flange comprising the other of: (i) at least one rabbet, or (ii) at least one mortice; the socket also comprising the other of: (i) at least one rabbet, or (ii) at least one mortice; the rabbet and the mortice oriented longitudinally for longitudinal sliding engagement of the locking ring with the flange and the socket to prevent rotation of said connector with respect to said socket.

In a fifth aspect of the invention there is a rake comprising a handle; a debris receptacle and tines; a debris clamp moveable form at least a first disengaged position to a second engaged position adjacent the receptacle; a connector system for fixedly attaching the debris receptacle to the handle; the connector system comprising a tapered threaded male connector; and the debris receptacle comprising a tapered threaded socket for engagement of the male connector.

BRIEF DESCRIPTION OF THE DRAWINGS

Preferred embodiments of the invention will now be described, by way of example, with reference to the accompanying drawings, in which:

FIG. 1, being

FIG. 2 being FIGS. 2a through 2e, in which 2a, 2b, and 2c show a perspective view, a plan view, and an elevational view, respectively, of a molded blank from which the connector of FIG. 1 is formed.

FIG. 3 being FIGS. 3a through 3f in which

FIGS. 4(a), (b), (c), and (d) shows a locking ring of the present invention for locking the connector of FIG. 1 in place.

FIG. 5 is a series of three views, 5a through 5c. View 5a shows a solid handle ready for engagement of a non-locking embodiment of a connector similar to that shown in FIG. 2d and a socket for accepting that connector. View 5b shows the non-locking embodiment of the connector of view 5a as assembled with the socket. View 5c is a cross-sectional view of the assembled locking connector of FIG. 1.

DETAILED DESCRIPTION OF THE BEST MODE OF THE INVENTION

Referring firstly to FIG. 1, a garden implement is indicated as 1. In the preferred embodiment this implement is a rake shown generally as 2 comprising an implement head assembly, a tine assembly 4, a sliding debris clamp assembly 6, a handle assembly 8 comprising a hand grip 9, and a connector 10. Handle assembly 8 comprises a grip 9 and a shaft of hollow tubing, or a handle 12.

Figure 1A:
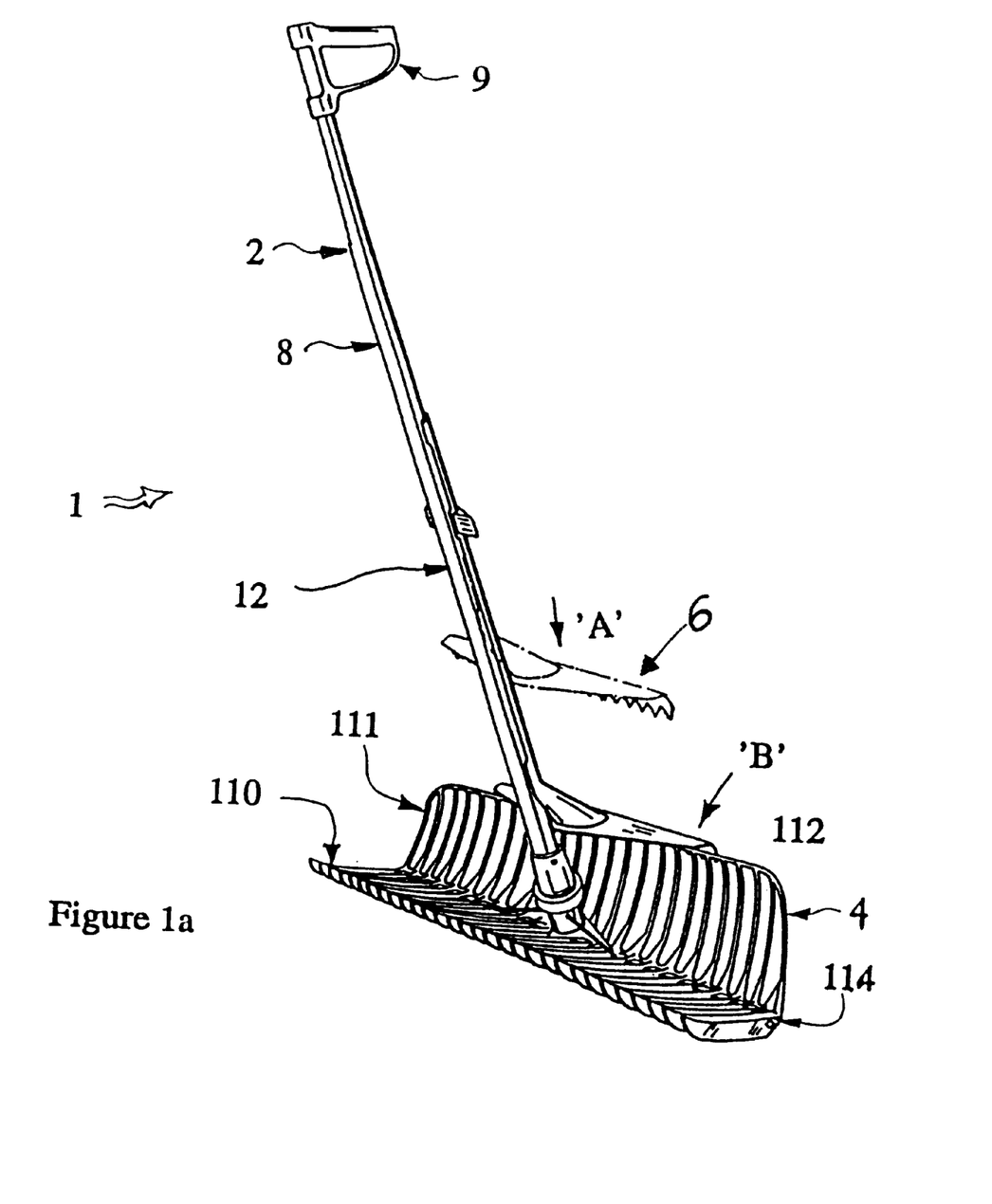
FIGS. 1a and 1b, shows the rake of the present invention with a slideable debris clamp and connector system.
Figure 1B:
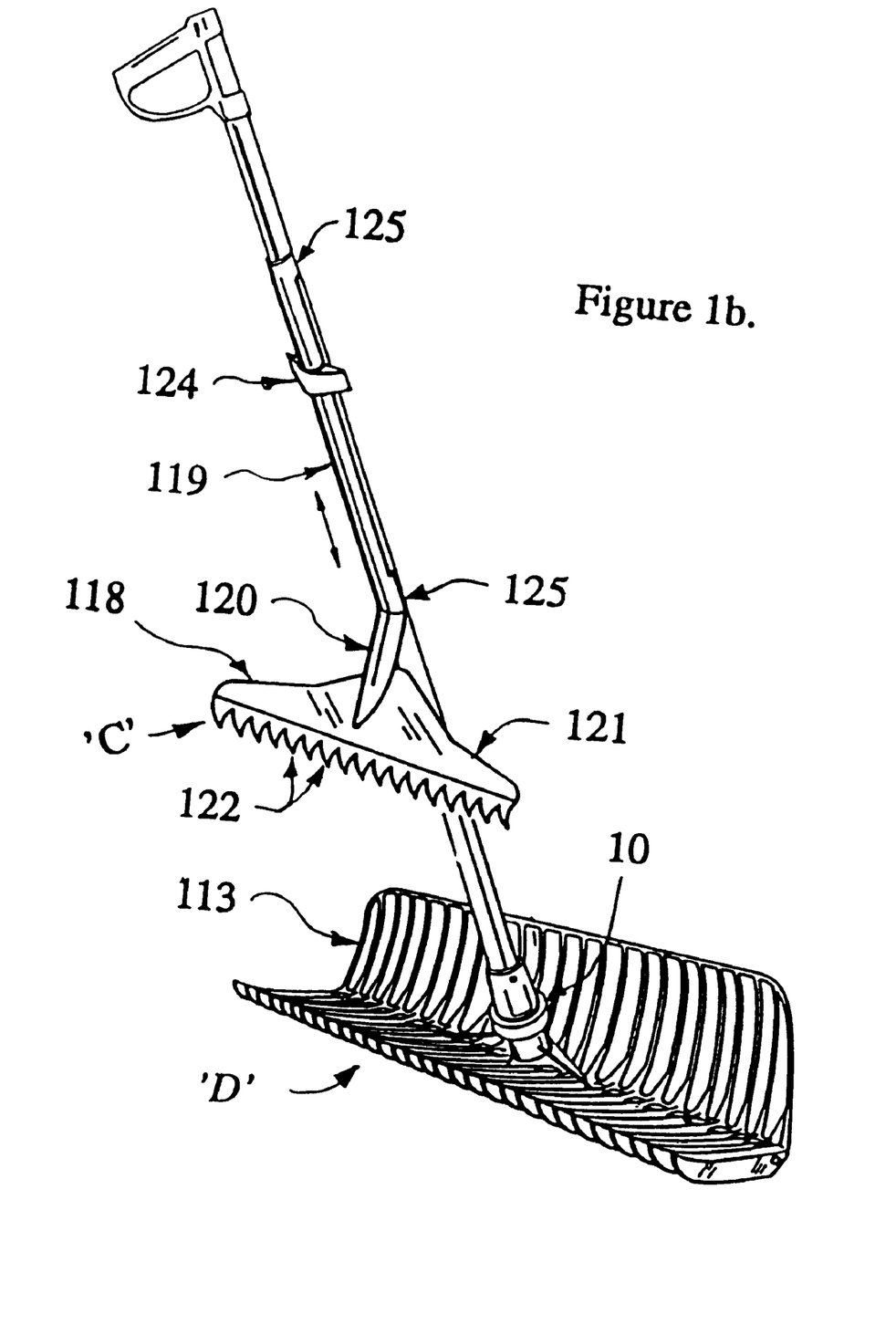
Figures 2A, 2B, 2C:
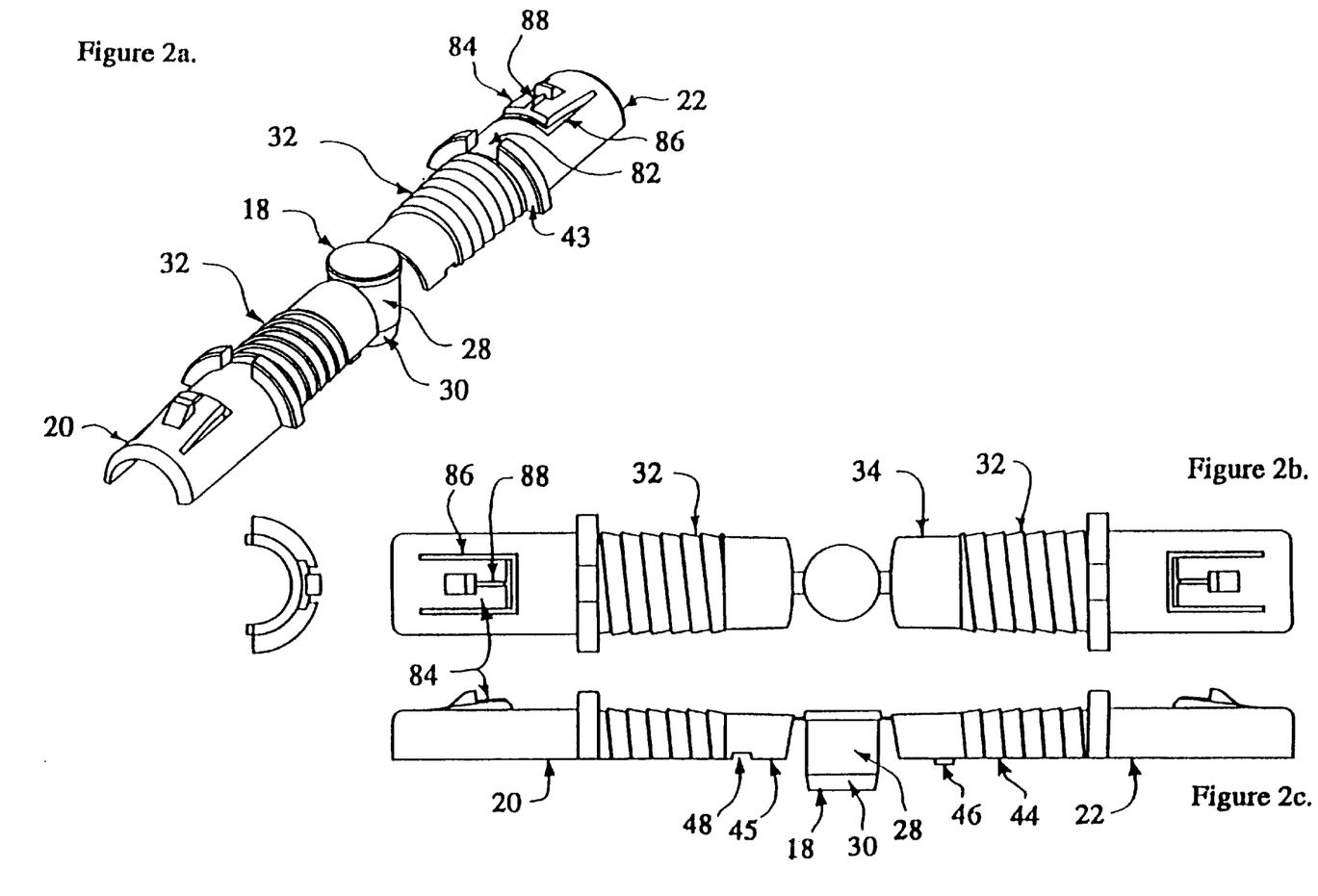
Figure 2D:
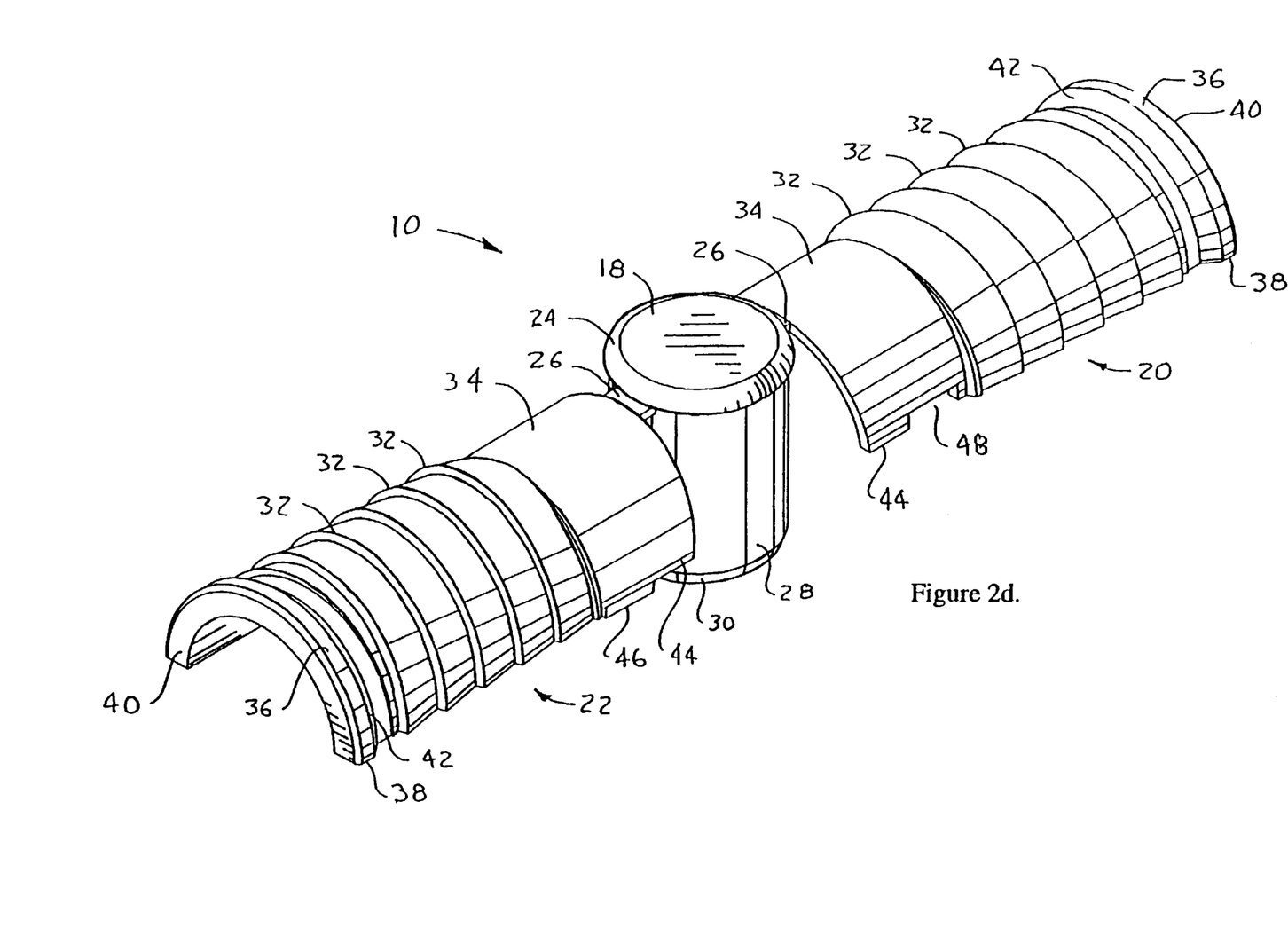
FIGS. 2d and 2e show an alternative embodiment of the connector of FIG. 1 that does not incorporate a locking ring.
Figure 2E:
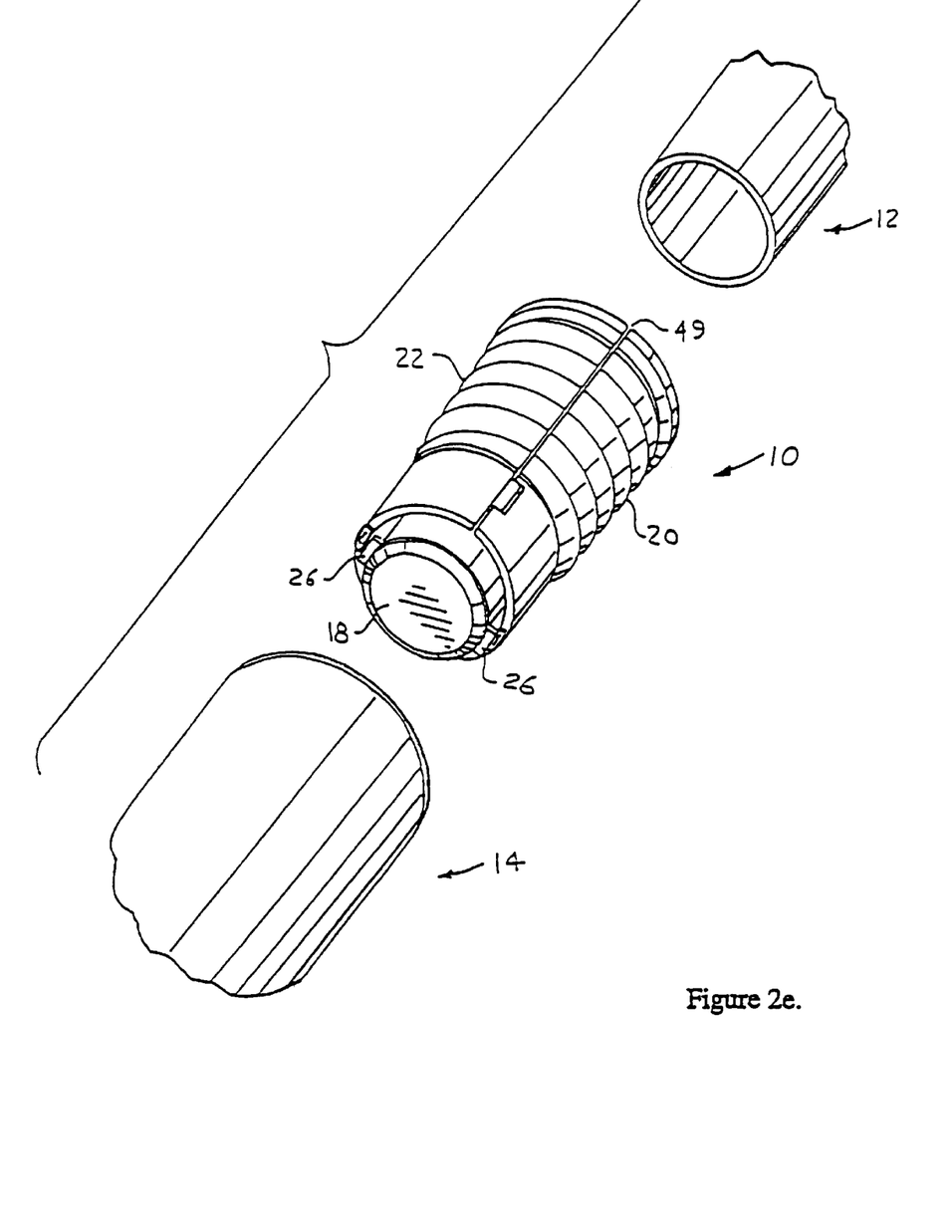

Referring to FIG. 2, a preferred embodiment of a threaded connector according to the present invention is generally indicated by reference numeral 10, and is located centrally about a tool axis 11. Threaded connector 10 is used to attach handle 12 shown in FIG. 1, to a tool head 14 such as tine assembly 8 shown in FIG. 1. Handle 22 could be formed of metal, such as aluminum or steel, or a plastic material having sufficient rigidity, or laid-up fibreglass. Handle 12 could also be made of wood with a hollow end, although the present invention would be best suited to hollow tubing. The second embodiment of the invention herein is best suited to solid shafts as will be described. A tubular fibreglass handle 12 is particularly advantageous in garden tools due to its rigidity and light weight. Handle 12 could be any desired length, but typically would not exceed 2 meters in length unless it were telescopic. The outside diameter of handle 12 typically is ±1", although it need not necessarily fall within this range.

Similarly, tool head 14 is may represent any type of tool, be it a rake head, hoe, broom, shovel, or other tool or implement. In the preferred embodiment the tool head is the ergonomically designed leaf scooping and lifting rake 4 suited for co-operation with an adjustable sliding scoop, such as the sliding debris clamp assembly 6 slideably mounted to handle 12.

Tool head 14 as shown in the drawings includes an internal or female thread 16 as seen best in FIG. 5b which mates with threaded connector 10 as will be described further below.

Referring next to FIG. 3, threaded connector 10 is made in clamshell form from a molded plastic blank. Connector 10 includes a central plug or cap 18 and a pair of opposed wings 20, 22. Cap 18 includes a top peripheral edge portion 24 to which wings, 20, 22 are hingeably attached by means of living hinges 26. Where cap 18 is in the form of a plug as shown in FIG. 2, it preferably is hollow and has a downwardly depending skirt 28. The outer diameter of skirt 28 is suitable for insertion within one end of hollow handle 12 and may comprise a lower peripheral bevelled edge 30 to facilitate that insertion. An firm interference fit which slightly compresses skirt 28 is advantageous.

Wings 20, 22 are in the form of hollow, concave sections having a transverse cross sectional curvature approximating that of a semi-circle. Two wings are shown in FIGS. 2 and 3, but connector 10 could be formed with three or more wings such that the total arc of the wings when folded as shown in FIG. 3c approximates circle. In the preferred embodiment when wings 20, 22 are folded inwardly toward cap 18 they come together to form a generally full cylinder as indicated in FIGS. 1, 3c and 5b. Wings 20, 22 include outer partial threads 32 which are in registration to form a full thread 33 when wings 20, 22 are folded inwardly as indicated in FIGS. 3 and 5. Threads 32 are of the buttress type, but other types of threads could be used as desired. Notably, when wings 20 and 22 are folded about a cylindrical shaft, such as handle 12, they form a tapered end such that thread 33 has a taper indicated as angle alpha in FIG. 3, when measured along the thread roots of one degree of arc from tool axis 11, the centreline of the shaft, or two degrees of arc over the diameter.

Wings 20, 22 also include smooth inner distal end portions 34 of reduced outer radius located between partial threads 32 and plug or cap 18. Outer distal end portions 36 of wings 20, 22 comprise transverse flanges 38 forming a collar 40 (see FIG. 3) when wings 20, 22 are folded inwardly. Collar 40 may include a ramp 42 shown in FIG. 5b facing partial threads 32, and ramp 42 may be used to engage the upper peripheral edge of female thread 16 on tool head 14 to help retain connector 10 screwed tightly into tool head 14. Alternatively collar 40 may present a substantially flat shoulder 43 extending perpendicularly to tool axis 11 for mating with a similar flat shoulder 47 on tool head 14.

Wings 20, 22 have longitudinal peripheral edge portions 44 and 45. Edge portions 44 comprise a depending tab 46. Edge portions 45 comprise rebates 48 adjacent to smooth distal end portions 34 corresponding in size and location to tabs 46. Tabs 46 engage or are matingly received in rebates 48 thereby ensuring alignment, or registration, of partial threads 32 when wings 20, 22 are folded inwardly.

Figure 3A:
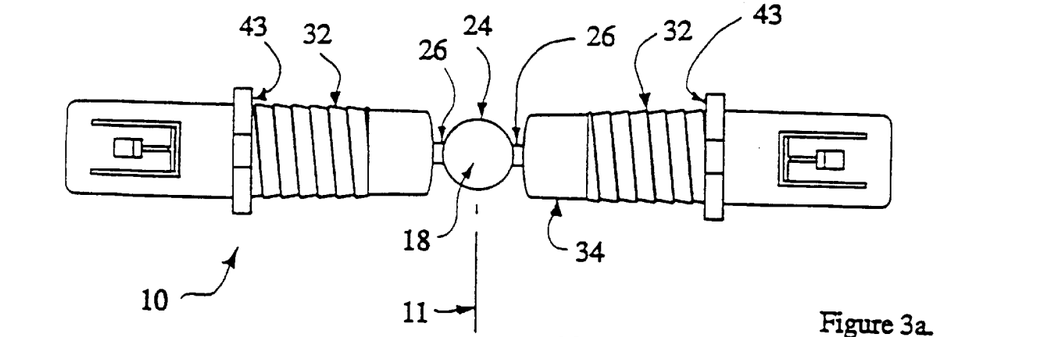
FIGS. 3a, 3b, and 3c show a series of three elevational views of the connector of FIG. 1 as it is folded to capture and adhere to a handle.
Figure 3B:
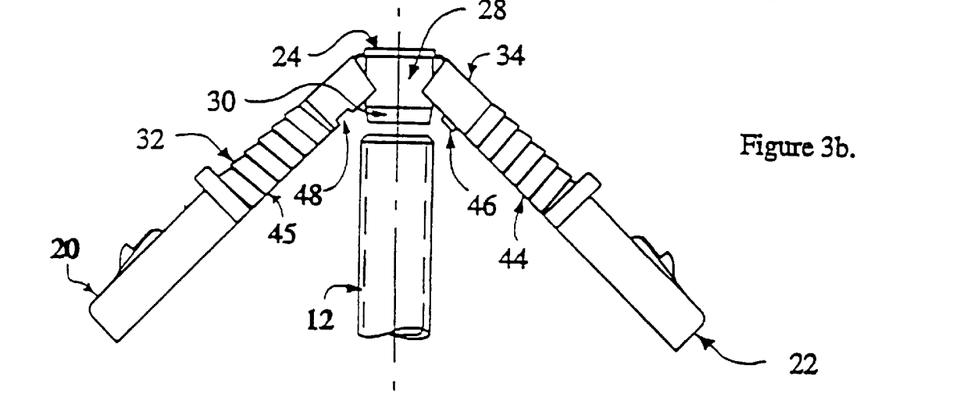
Figure 3C:
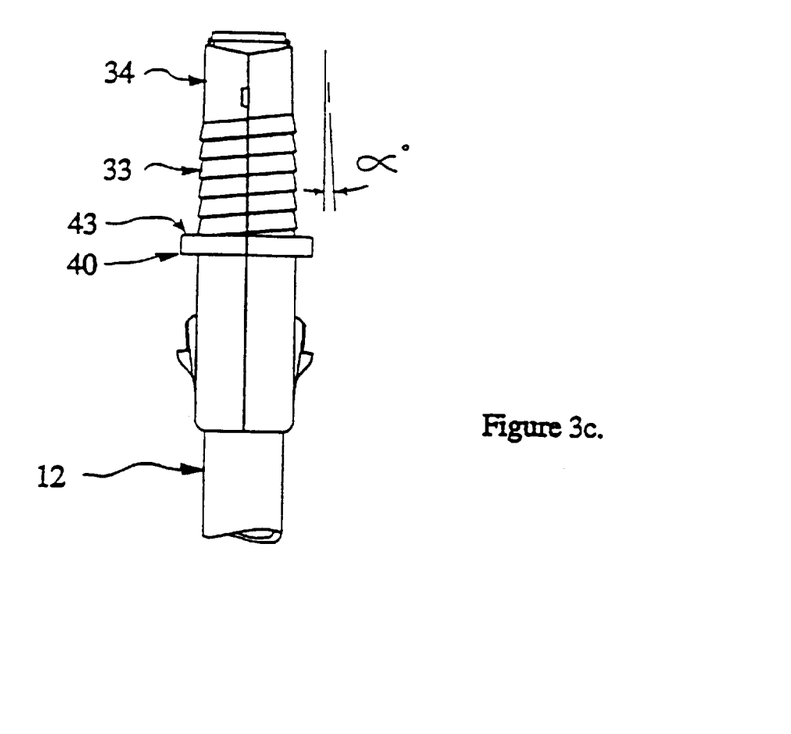
Figure 3D:
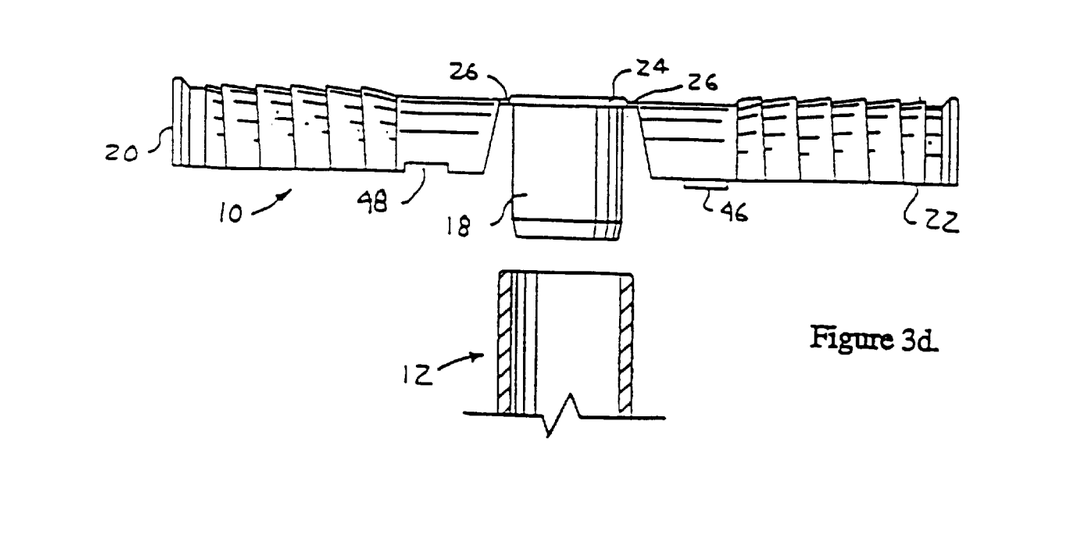
FIGS. 3d through 3f show the corresponding connector for use without a locking ring.
Figure 3E:
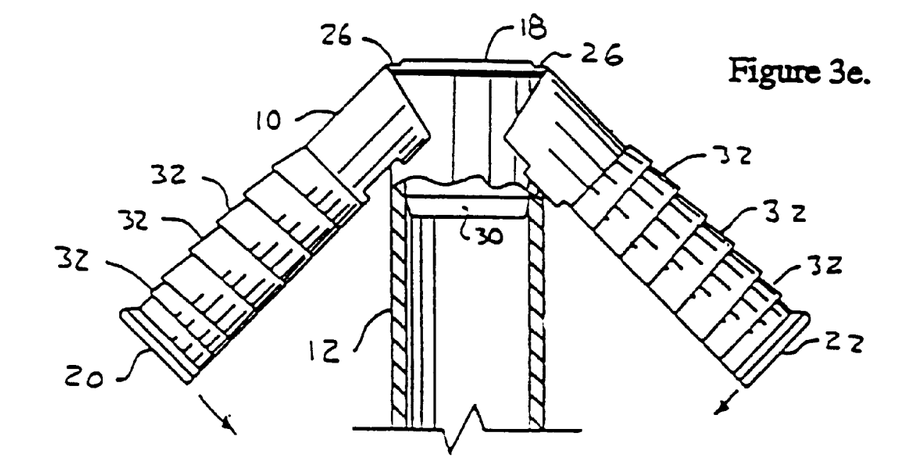
Figure 3F:
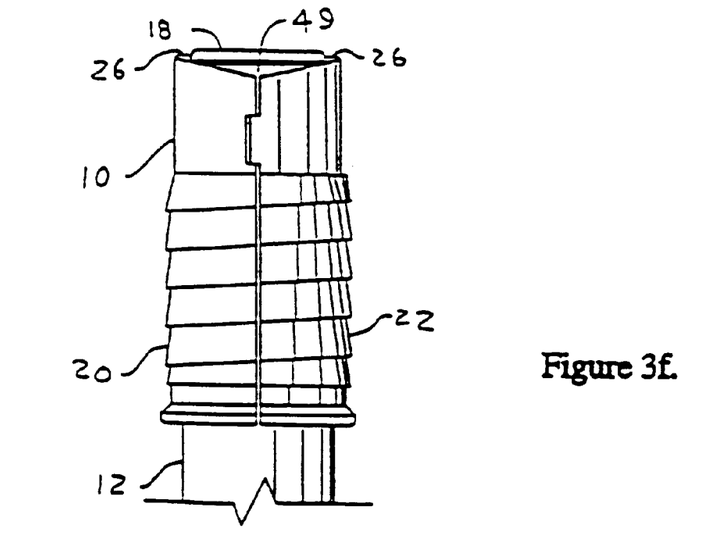
Figures 4, 4A, 4B, 4C:
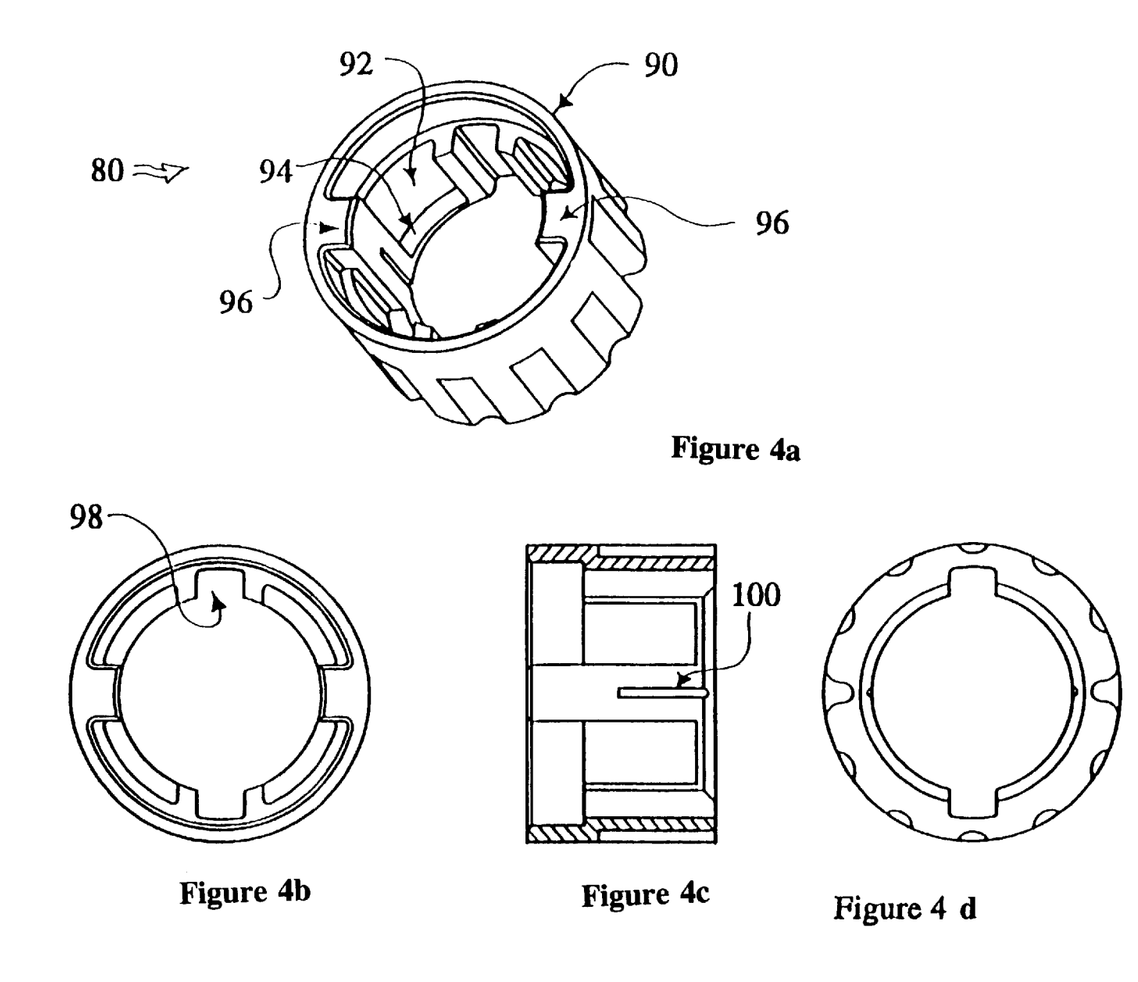

Referring next to FIGS. 3a, 3b, and 3c, the assembly of connector 10 to a handle 12 will now be described. Connector 10 is positioned over handle 12 and plug or cap 18 is inserted into the open end of handle 12. A suitable adhesive, bonding agent, or epoxy is applied to handle 12. The choice of adhesive will depend on the materials being used. Wings 20, 22 are then folded downwardly and inwardly as indicated by the arrows in FIG. 4 until wings 20, 22 contact the sides of handle 12.

The inner radius of wings 20, 22 is preferably slightly less than the outer radius of handle 12, ensuring that wings 20 and 22 are slightly stretched when in place. Similarly the sector of arc described by wings 20 and 22 is preferably slightly less than 180 degrees (or if three wings, slightly less than 120 degrees, and so on) so that a narrow longitudinal gap 49 remains between wings 20, 22. This ensures a tight fit between connector 10 and handle 12 and accommodates any dimensional variations or tolerances in the outer diameter of handle 12.

The suitable adhesive used between connector 10 and handle 12 is intended to ensure that handle 12 does not pull out of connector 10. Unlike previous sliding insertion connectors, the folding action of the clamshell exhibits less of a tendency to strip glue out of the joint. This is intended to yield more uniform adhesion. Connector 10 preferably is formed of a plastic material such as ABS or PVC plastic suitable for use with commercially available bonding agents.

Figure 5A:
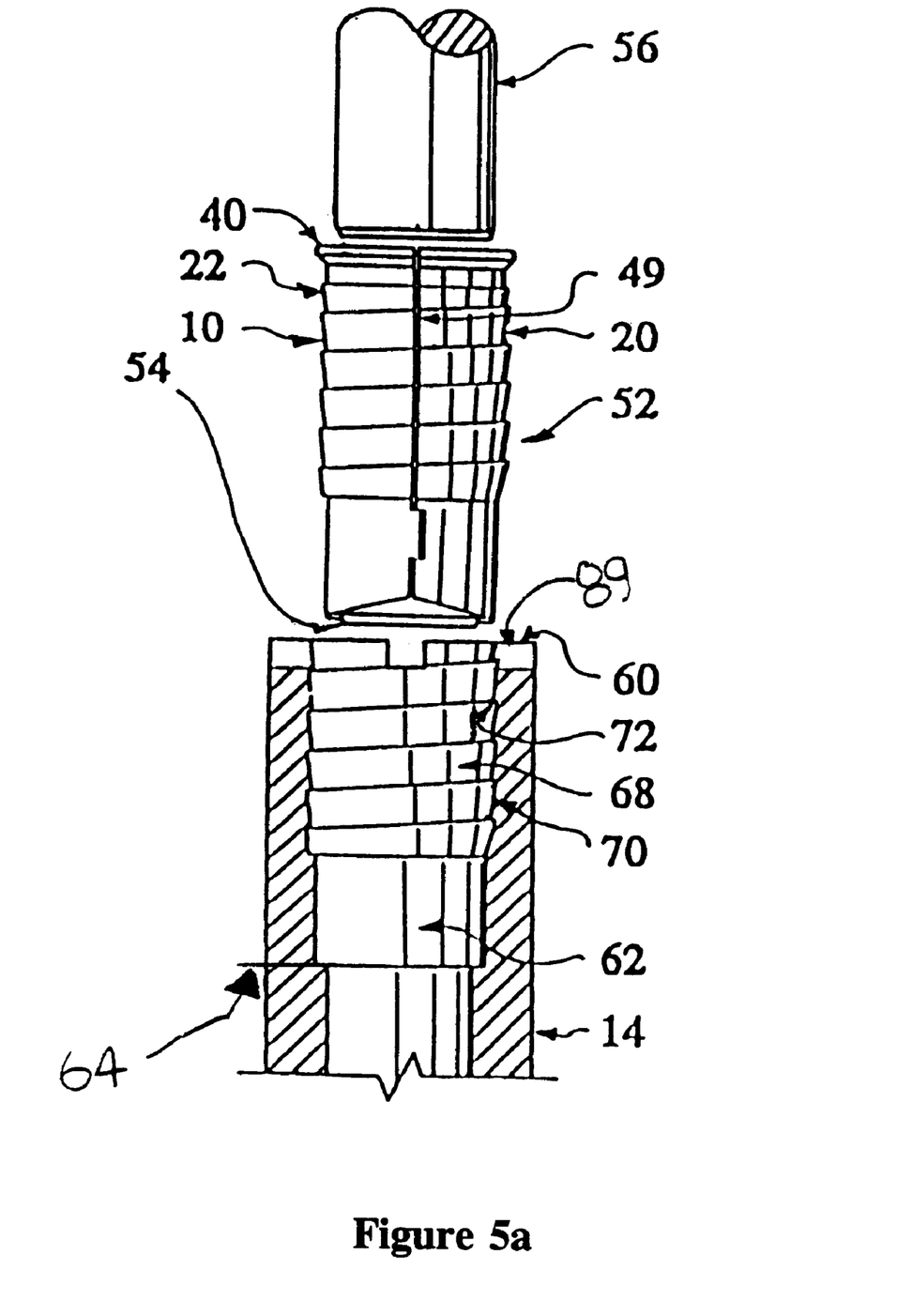
Figure 5B:
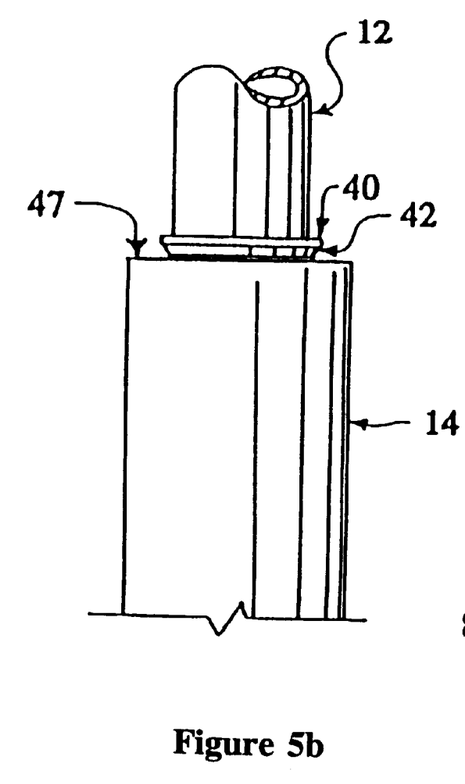
Figure 5C:
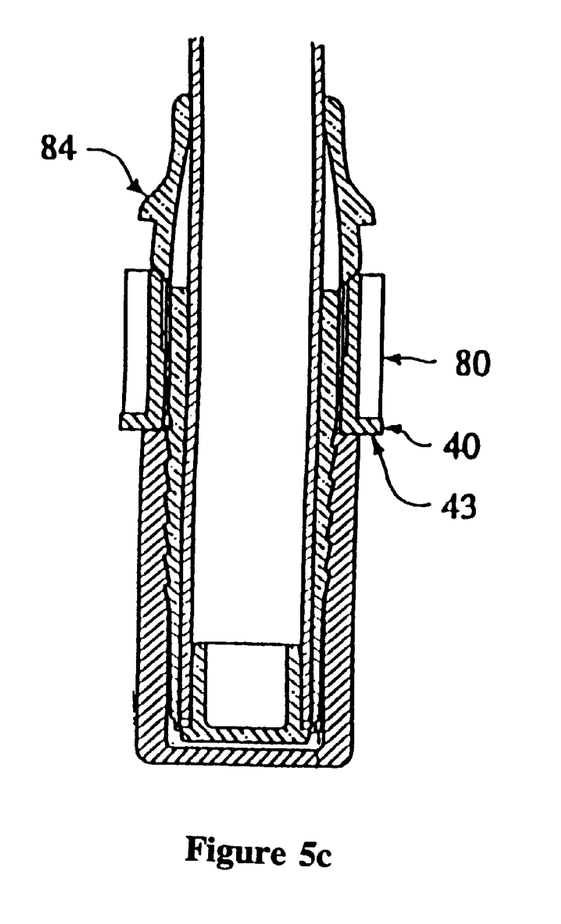

Referring next to FIGS. 5, being the series of FIGS. 5a, 5b and 5c, the assembled configuration will be explained. A solid handle 56 is shown in FIG. 5a. The connector 52 to be used with solid handle 56 has a flat or planar cap 54 rather than a hollow plug as in connector 10. Otherwise, the construction of connector 52 is the same as connector 10.

The tapered, threaded male connection shown in FIG. 5a is introduced into the mating female socket 60 of a tool head 14. Socket 60 comprises an inner cylindrical surface and a transverse horizontal face defining an end cavity 62 which may be provided with a drain hole 64 (not shown). At the end of socket 60 first approached by male connector 10 is flat transverse annular face or shoulder 47 suited for substantially planar engagement of shoulder 43. Adjacent the cylindrical surface of end cavity 62 is a tapered threaded surface 68 extending to face 47. The taper of the threads is, as before, 1 degree from axis 11, widening toward the mouth of socket 60. Note also that, as before, the thread profile has a shallow sloped helical face 70 and a steep, or perpendicular sloped helical face 72.

As male connector 10 is introduced into socket 60 thread 33 begins to engage threaded surface 68. The taper of the threads makes initial insertion easy since the diameter of cap 18, and distal portions 34 is comfortably less than the diameter of the mouth of socket 60. As the handle is turned to tighten the connection, male connection 10 is driven ever more firmly into female socket 60, the mechanical advantage provided by the small angle of the taper and pitch of the threads making it possible to generate by hand tightening alone significant tensile hoop stresses in the socket and compressive stresses in the male connector, the connector thereby tending to bind within the socket like a wedge.

This wedging action may alone be sufficient to hold a handle in place for many purposes. However the present invention further comprises a locking ring shown generally as 80.

Threaded connector 10 further comprises at least one rabbet 82, at least one peninsular spring loaded catch 84, a slot 86 about the periphery of catch 84, and at least one detent ridge 88. Similarly socket 60 in tool head 14 is provided with at least one rabbet 89 corresponding to rabbet 82 in connector 10. Locking ring 80 comprises an annular body 90, an internal cylindrical surface 92, an inner forward facing shoulder 94, at least one protruding tenon 96, at least one rabbet 98, and at least one longitudinal detent channel 100.

In the preferred embodiment connector 10 comprises two catches 84, and four rabbets 82 longitudinally traversing collar 40 on 90 degree centres, two of those rabbets being aligned with catches 84. In the preferred embodiment locking ring 80 comprises two rabbets 98 in diametric opposition, alignable with catches 84. When thus aligned locking ring 80 may be removed along the length of handle 12.

The inner diameter of shoulder 94 is great enough to permit collar 80 to slide along, and in firm contact with, the surface of wings 20 and 22 toward collar 40. There are two tenons 96 disposed circumferentially within cylindrical surface 92 on 180 degree centres, 90 degrees offset from rabbets 98, which are themselves on 180 degree centres. The clearance diameter between opposed tenon faces is sufficient to allow passage closely along wings 20 and 22 as folded.

Once rabbets 98 have passed over catches 94, locking ring 80 is turned to align tenons 96 with rabbets 82. This alignment is facilitated by the sensible detent provided by engagement of ridges 88 in detent channels 100. In this position the two opposed tenons 96 cause spring loaded catches 84 to be depressed. Tenons 96 have a length parallel to axis 11 substantially equal to the combined length of rabbets 82 and rabbets 89 in tool head 14.

Assuming that handle 12 has been located in tool head 14 and threads 32 have been filly tightened within threaded surface 68, such that rabbets 82 are aligned with rabbets 89 in tool head 14, locking ring 80 can be pushed forward to register tenons 96 in rabbets 82 and rabbets 89, thus preventing male connector 10 from turning relative to female socket 60. When locking ring 80 is in its fully engaged position catches 84 spring outward, thus preventing locking ring 80 from slipping out of place. For removal one may easily depress catches 84 with one's fingers and withdraw locking ring 80. The structural loads imposed on connector 10 by pushing or pulling the implement are not carried by locking ring 80. Further, in use locking ring 80 only serves to prevent rotation of connector 10 with respect to tool head 14. It does not have to compress a locking member into the structure of the implement. It does not have to be tightened by like a screw, and equally, it is less prone to loosening loose like a screw or nail. Those skilled in the art will appreciate that tenons 96 could be formed on socket 60 and connector 10 and co-operating rabbets formed on locking ring 80 and either a greater or lesser number of rabbets and tenons could be used to obtain a similar result.

As shown in FIGS. 1a, 1b, and 1c, rake 2 consists of tines 110 which continue into spines 111. Those spines are connected by means of a border moulding 112. The spines 111 and border moulding 112 form a half-basket like debris receptacle shown generally as 113. This receptacle is attached to the tines at an angle greater than 90 degrees and incorporates a concave curve at the top. The tines 110 are separated by fillers 114 and fixed in position. Reinforcement gussets 115 are included between the tines 110. The tines 110 including the reinforcement gussets 115 and the spines 111, the border moulding 112 and the fillers 114, in essence the whole rake component, can be manufactured in one single piece, e.g. by means of an injection moulding process.

FIG. 1b again shows the complete rake 2 handle assembly 14. The handle socket 60 is mounted in the transition area between tines 110 and debris receptacle 113 and this socket is angled in relation to the real or transient plane of the tines, ensuring that the handle 12 is in optimal position for the operator. A debris clamp 118 is mounted on handle 12. It is affixed in such a way that it can slide in a linear direction, and also rotate on the handle. The debris clamp 118 consists of a casing 119 which clasps handle 12. An angled arm 120 connects this casing 119 with the debris clamp head 121. The forward edge of the debris clamp head 121 consists of pointed prongs 122 which facilitate gripping of the debris placed into the debris receptacle 113 of the rake. The debris clamp head 121 in its closed position partially covers the debris receptacle 113 thereby securing refuse material inside debris receptacle 123. In order to operate the debris clamp 118 a grip 124 is incorporated into the casing 119. To rotate the debris clamp 118 around the longitudinal axis 11 of the handle 12 or to remove the debris clamp 118 from the handle 12, casing 119 is fashioned in the shape of a half pipe, and both ends of this casing 119 are fitted with tensioned extension wings 125 which extend past the halfway point of the circumference of the handle 116. Casing 119 and tensioned extension wings 125, the arm 120 and debris clamp head 121, and the grip 9 are constructed of an appropriate plastic material and can, if desired, be manufactured in one piece by means of a plastic injection moulding process.

FIGS. 1a illustrates the position of the debris clamp 118 in its stored position on rake 2 indicated at arrow "A". The resting position of debris clamp 118 is illustrated in heavy line and indicated by arrow "B". In reference to its active position, debris clamp 118 is rotated 180 degrees around longitudinal axis 11 of rake handle 12 and moved against rake tool head 14 in order for one or several catches (not illustrated) to lock into corresponding recesses in the border moulding 112 of the refuse receptacle of the rake 113. This secures debris clamp 118 against slippage and rotation. Alternatively, the arresting mechanism of the debris clamp 118 may be constructed by utilizing a ball-spring lock.

The angle of handle 12 in relation to the real or transient plane of the tines 110 is about 45 degrees. This angle is deemed to be suitable to the average height of the operator, and by raising or lowering the rake handle the angle of the tines with respect to the ground is adjustable to the appropriate raking situation.

When slid downward, the debris clamp head 121 covers the interior of the debris receptacle to a large part and allows compacting of the collected material in order that first: by means of compacting a larger quantity of refuse can be collected in the debris receptacle 123, and second: it allows transportation of the collected refuse to a disposal site, incurring a minimum of loss. The collected material may be dumped by sliding debris clamp 118 away from debris receptacle 123. The upper thin line illustration of the debris clamp shows the position of the debris clamp 118 in the open "ready to compact" position indicated by arrow 'C', before a linear movement towards the rake to the compacting position indicated by arrow "D".

It will be apparent to those skilled in the art that in light of the foregoing disclosure, many alterations and modifications are possible in the practise of this invention without departing from the spirit or scope thereof. Accordingly, the scope of the invention is to be construed in accordance with the substance defined in the following claims.

I claim:

1. A connector system comprising:
   (a) a threaded male connector having an external flange;
   (b) a tool head having a threaded female socket for reception and engagement of said threaded male connector;
   (c) a handle having a longitudinal axis, said threaded male connector affixed to an end of said handle and said external flange extending perpendicularly to said longitudinal axis of said handle;
   (d) a locking ring having one of:
      (i) at least one rabbet, or
      (ii) at least one tenon;
   said external flange and said threaded female socket each having the other of:
      (i) at least one rabbet, or
      (ii) at least one tenon;
   complimentary to said one presented by said locking ring wherein said rabbet and said tenon are oriented longitudinally for longitudinal sliding engagement of said locking ring with said external flange and said threaded female socket to prevent rotation of said threaded male connector with respect to said threaded female socket.

2. A connector system as claimed in claim 1 wherein said threaded male connector further comprises a catch member wherein said catch member engages said locking ring to prevent said locking ring from moving.

3. A connector system as claimed in claim 2 wherein said locking ring has:

(i) at least one rabbet, and (ii) at least one tenon and said external flange and said treaded female socket each have at least one rabbet.

4. A connector system as claimed in claim 3 wherein said at least one rabbet of said external flange is oriented for longitudinal alignment with said at least one rabbet of said threaded female socket.

5. A connector system as claimed in claim 4 wherein said at least one tenon of said locking ring is oriented longitudinally for longitudinal sliding engagement with said rabbet of said external flange and said rabbit of said threaded female socket to prevent rotation of said threaded male connector with respect to said treaded female socket.

6. A connector system as claimed in claim 5 wherein said threaded female socket is presented by said tool head.

7. A connector system as claimed in claim 6 wherein said tool head comprises a rake.

8. In combination, a connector system, a handle, and a rake head comprising:

(a) a threaded male connector having an external flange;

(b) said rake head having a threaded female socket for reception and engagement of said threaded male connector;

(c) said handle having a longitudinal axis, said threaded male connector affixed an end of said handle an said external flange extending perpendicularly to said longitudinal axis of said handle;

(d) a locking ring having at least one tenon;

(e) said external flange and said threaded female socket each having at least one rabbet wherein said rabbet and said tenon are oriented longitudinally for longitudinal sliding engagement of said tenon of said locking ring with said rabbet of said extended flange and said treaded female socket to prevent rotation of said threaded male connector with respect to said threaded female socket.

9. The combination as claimed in claim 8 wherein said rake head includes a debris receptacle and tines.

10. The combination as claimed in claim 9 further including a debris clasp moveable along said handle from at least a first disengaged position to a second engage position from said debris receptacle.

* * * * *